United States Patent [19]
Ando et al.

[11] Patent Number: 5,708,895
[45] Date of Patent: Jan. 13, 1998

[54] CAMERA

[75] Inventors: Hiroyuki Ando, Hachioji; Tatsuya Suzuki, Tokyo; Kazuo Yamamoto, Tama; Takashi Muroi, Tachikawa, all of Japan

[73] Assignee: Olympus Optical Co, Ltd., Tokyo, Japan

[21] Appl. No.: 526,062

[22] Filed: Sep. 8, 1995

[30]   Foreign Application Priority Data

Sep. 21, 1994 [JP] Japan ..................... 6-227100
Sep. 22, 1994 [JP] Japan ..................... 6-228374

[51] Int. Cl.$^6$ ........................... G03B 17/02; G03B 11/00
[52] U.S. Cl. ............................. 396/535; 396/544
[58] Field of Search ....................... 354/288, 295; 396/535, 544

[56]   References Cited

U.S. PATENT DOCUMENTS

3,585,913  6/1971  Lange ........................ 354/288
3,602,118  8/1971  Oberheim .................... 354/288
3,936,851  2/1976  Wareham ..................... 354/288

*Primary Examiner*—Safet Metjahic
*Assistant Examiner*—John Chizmar
*Attorney, Agent, or Firm*—Louis Weinstein

[57]   ABSTRACT

A camera whose body is wound with a belt-like protective cover having an end detachably held by pin members thereon in such a manner as to cover a wall surface thereof. The protective cover is operative to cover and protects at least a photographing lens, a distance measuring or range finder window and a stroboscopic window. Thus, the camera is put into an enclosed state. Further, the enclosed state, in which the protective cover is wound around the body of the camera, is maintained by fitting a magnet hook attached to the other end of the protective cover into another magnet hook attached to the body of the camera and making these magnet hooks attracted to each other. Moreover, when putting the camera into a ready-to-photograph state, the protective cover is unwound by removing the magnet hooks from each other and opening the photographing lens and so on.

38 Claims, 5 Drawing Sheets

CAMERA

BACKGROUND OF THE INVENTION

1. Field of the Invention

The present invention generally relates to a camera and more particularly to a structure of a protective cover for enclosing a camera therein.

2. Description of the Related Art

A conventional camera employs a lens cap, a lens barrier or the like as a lens protecting means. Further, in the case where a user brings such a conventional camera with him, he preliminarily encloses the entire camera in a protective case and then carries the camera put into such a state.

However, in the case where a user carries the conventional camera enclosed in the protective case, before he starts photographing, he should take the body of the camera out of the protective case. Thereafter, it is further necessary for him to remove the cap from the body of the camera or to open the lens barrier. Thus, the conventional camera is somewhat lacking in readiness of photographing. Further, there have been no conventional cameras contrived in such a manner as to be convenient for starting a continuous photographing or for performing a long-duration photographing.

OBJECT AND SUMMARY OF THE INVENTION

Accordingly, an object of the present invention is to provide a camera to which a protective member being capable of putting the camera into a ready-to-photograph state or into an enclosed state by a simple operation is applied for enhancing the readiness of photographing, instead of a conventional camera case or the like which gives a user a lot of trouble in taking the camera in and out of a protective case.

To achieve the foregoing object, in accordance with an aspect of the present invention, there is provided a camera that comprises: a belt-like protective cover which is supported on the body of the camera in such a manner as to cover the wall surface of the body of the camera and is adapted to cover and protect at least an objective optical element of a photographing optical system; and elastic fixing means for making at least an edge portion of the protective cover supported by the body of the camera. In the case of this camera, the camera can be put into the enclosed state by covering the wall surface thereof with the protective cover. Further, the camera can be put into the ready-to-photograph state by opening the protective cover.

Other features, objects and advantages of the present invention will become apparent from the following description of preferred embodiments with reference to the drawings in which like reference characters designate like or corresponding parts throughout several views.

DETAILED DESCRIPTION OF THE PREFERRED EMBODIMENTS

Hereinafter, the preferred embodiments of the present invention will be described in detail by referring to the accompanying drawings.

Figure 1:
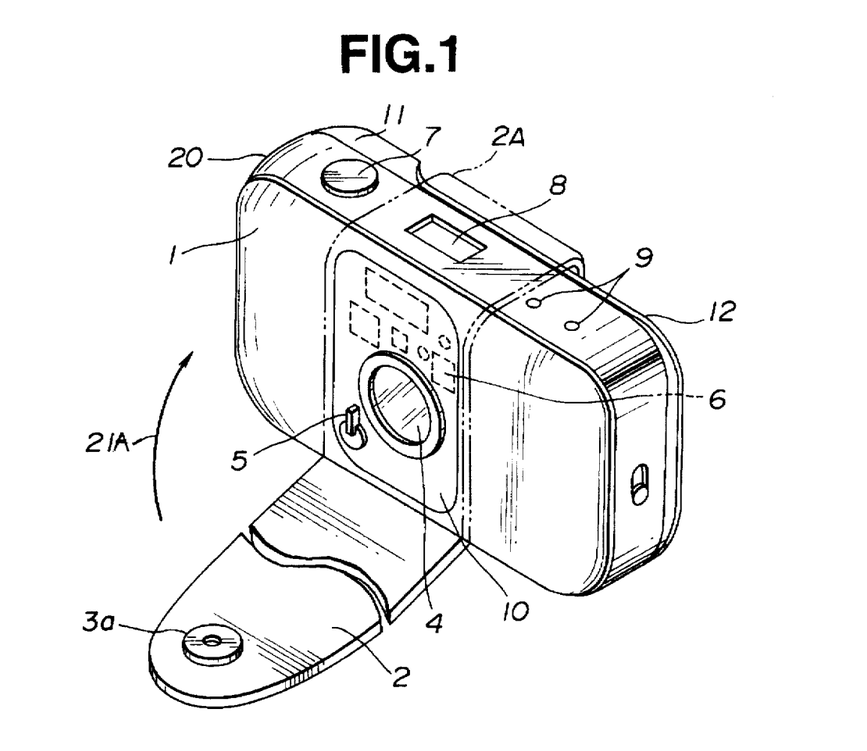
FIG. 1 is a perspective view of a camera embodying the present invention, namely, a first embodiment of the present invention, taken from the front thereof.

As shown in FIG. 1 which is a perspective view of a camera embodying the present invention, namely, a first embodiment of the present invention, taken from the front thereof, a front cover 1 is mounted on the front surface of the body 20 of the camera. Further, a front cover panel 10 is fitted into the central wall surface portion of the cover 1.

A photographing lens 4 serving as an objective optical element of a photographing optical system is provided in the central portion of the cover panel 10. Further, a power switch 5 is provided in the lower portion thereof. Furthermore, a window portion 6 consisting of an automatic focusing (AF) distance measuring window (or range finder window) and a stroboscopic window used for an AF distance measuring element and a stroboscopic light emitting device, respectively, is provided in the upper portion thereof. Furthermore, a release button 7, an indication liquid crystal display (LCD) 8 and mode selecting buttons 9 are provided in the top portion of the body 20 of the camera.

Figure 3A:
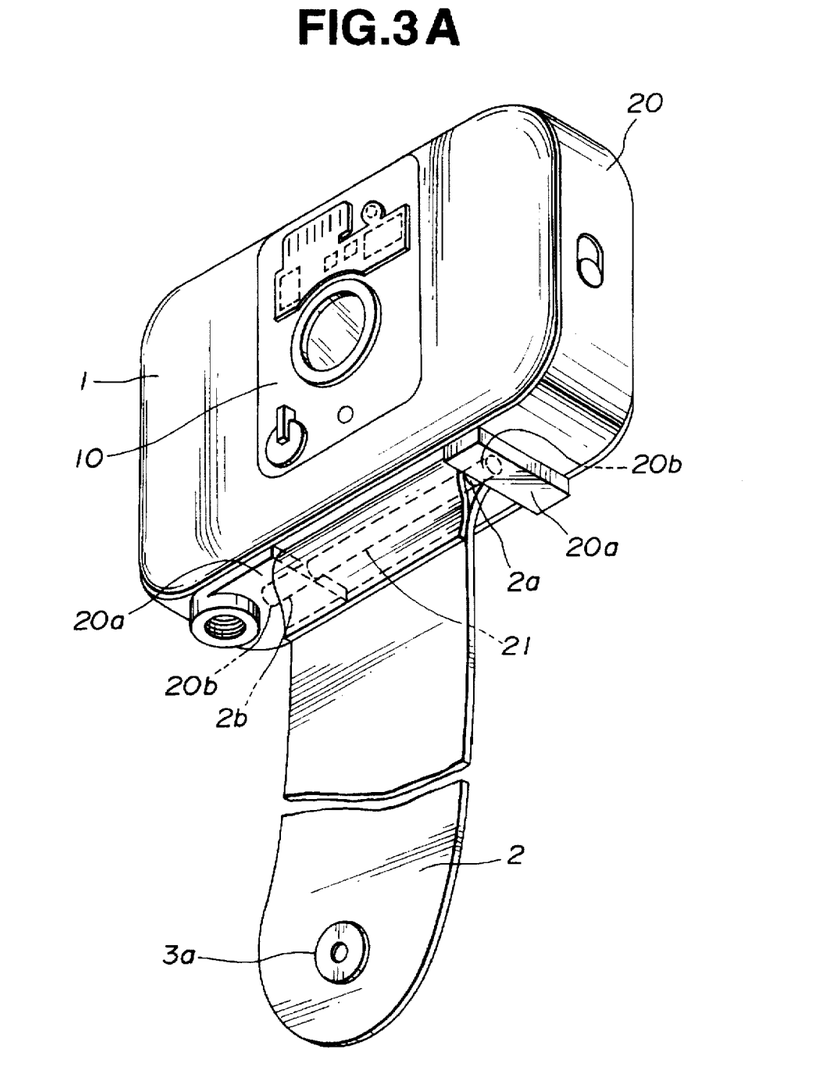
FIG. 3A is a perspective view of the camera of FIG. 1, from which an edge portion of a protective cover is removed, taken from the bottom thereof.

Further, as shown in the perspective view of FIG. 3A, protective cover supporting portions 20a, in each of which a corresponding one of supporting holes 20b facing to each other is bored, is provided on the bottom surface of the body 20 of the camera. Furthermore, supporting pin portions 2a and 2b of a detachable protective cover 2 can be rotatably fitted into the holes 20b of supporting portions 20a.

Figure 2:
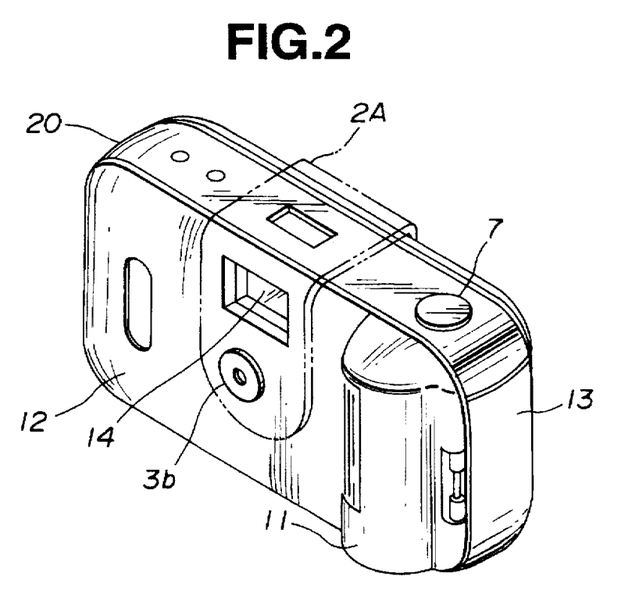
FIG. 2 is a perspective view of the camera of FIG. 1 taken from the rear thereof.

Moreover, as shown in the perspective view of FIG. 2, a rear cover 11, a rear lid 12 and a battery lid 13 are provided on the rear surface and one side surface of the body 20 of the camera. An eyepiece window 14 is provided in the central top portion of the rear lid 12. Further, a male magnet hook 3b, which can be attracted by or detached from a female magnet hook 3a serving as one of a pair of first fixing members of the protective cover 2 (to be described later) and serves the other of the pair of the first fixing members, is provided under the window 14.

The protective cover 2 is made of a bendable belt-like leather, and has a width sufficient for covering the width of the cover panel 10. Further, a pin member 21, which usually protrudes from the sides of the cover 2 and can be retreated in the inward direction of the width thereof owing to elastic deformation and has two supporting pin portions 2a and 2b at both ends in the direction of the width thereof, respectively, and serves as a second fixing member, is attached to an edge of the cover 2.

Furthermore, the female magnet hook 3a, which can be attracted by or detached from the male magnet hook 3b provided on the body of the camera, is provided at the other end of the protective cover 2.

Additionally, to attach this protective cover 2 to or detach the cover 2 from the body 20 of the camera, the elastic deformation of the pin member 21 is first caused. Thus, the supporting pin portions 2a and 2b are once retreated in the inward directions of the pin member 21, respectively, and are then inserted into the supporting holes 20b bored in the supporting portions 20a mounted on the body 20 of the camera. As a result, an end or edge portion of the protective cover 2 is attached to the body 20 of the camera, as illustrated in FIG. 3A. Further, in the case where the protective cover 2 is detached from the camera, the elastic deformation of the supporting pins 2a and 2b is caused, so that the supporting pin portions 2a and 2b are retreated in the inward directions of the pin member 21, respectively, and are thus pulled out of the supporting holes 20b, respectively. Thus, the protective cover 2 can be separated from the body 20 of the camera.

Figure 3B:
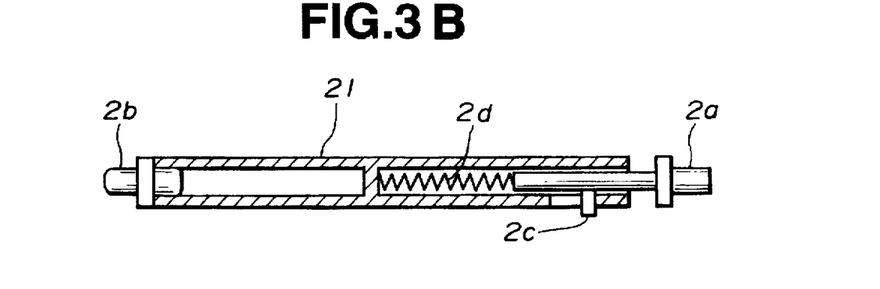
FIG. 3B is a sectional diagram for illustrating an example of a pin member having a supporting pin of FIG. 3A.

The sectional diagram of FIG. 3B illustrates an example of the structure of the pin member 21 on which the supporting pin portions 2a and 2b are mounted. In the structure of this pin member 21, one of the two supporting pin portions 2a and 2b, namely, the supporting pin portion 2b is securely fixed to the cylindrical pin member 21 in this case. The other supporting pin portion 2a is supported on the pin member 21 in such a manner as to be able to slide along the member 21. Moreover, the supporting pin portion 2a is supported thereon by being pressed outwardly by a compression spring 2d. The pin member 21 is fitted into the protective cover 2. When the protective cover 2 is attached to the body 20 of the camera of FIG. 3A, the supporting pin portion 2a is once pressed into the pin member 21 by operating a knob 2c. Then, the supporting pin portions 2a and 2b are fitted into the supporting holes 20b, respectively. Thus the protective cover 2 is attached to the body 20 of the camera.

In the case of the camera of this embodiment constructed as above described, in order to put this camera into the enclosed state in which this camera can be carried, the protective cover 2, attached to the body 20 of the camera as shown in FIG. 3A, is wound around the body 20 of the camera in the direction of an arrow 21A of FIG. 1. Thus, the camera protective cover is put into a wound state 2A indicated by two-dot chain lines and curves (see FIG. 2). Further, the female magnet hook 3a is fitted into the male magnet hook 3b attached to the body 20 of the camera as illustrated in FIG. 2. Thereby, the camera can be easily put into the enclosed state.

When the camera cover is in the wound state 2A, the protective cover 2 encloses the power switch 5, the photographing lens 4, the window portion 6 consisting of the windows such as the distance measuring window (or range finder window) and the stroboscopic window, the LCD 8 mounted on the top portion of the body 20 of the camera and the eyepiece window 14 provided on the rear lid. Thus, the camera is put into the enclosed state in which each of the aforementioned members is protected against dust and damage.

Furthermore, in order to put the camera of this embodiment into the ready-to-photograph state, the female magnet hook 3a is detached from the male magnet hook 3b so as to put the camera into an opened state of FIG. 3A. Thus, the camera comes to be able to take a picture.

As described above, the camera of this embodiment uses the belt-like protective cover 2, whereby it becomes easier to enclose the camera and to open the protective means in comparison with the case of employing the camera protecting case as used for the conventional camera, the attachment and detachment of which take time. Thus, in the case of quickly changing the state of the camera from the enclosed state to the ready-to-photograph state, a user or operator has only to unwind the protective cover 2. Further, in the case of quickly putting the camera into the enclosed state, a user has only to wind the protective cover 2 around the body 20 of the camera. Thereby, the camera of this embodiment excels at the readiness of photographing. Moreover, the camera of this embodiment can be easily put into the enclosed state. Consequently, the ease of use of the camera can be enhanced very much.

Furthermore, the protective cover 2 is a member that itself has a structure simpler than the structure of the camera protective case for the conventional camera. Thus, the camera of this embodiment has an advantage in the low cost thereof.

Moreover, the female and male magnet hooks 3a and 3b serving as the pair of the first fixing members are applied or attached to the protective cover and the body of the camera of this embodiment, respectively. Thus, a fixing operation can be facilitated.

Incidentally, a reinforcing plate may be put into each of portions which face the photographing lens 4 and the window portion 6. Thus, the camera can be protected more perfectly.

Additionally, artificial leather and synthetic leather other than real leather may be applied to or used as the leather which is the material of the protective cover 2 of the camera of this embodiment. Alternatively, woven fabric cloth may be used as the material of the protective cover 2.

Further, in the case of the aforementioned embodiment, the magnet hooks 3a and 3b are applied to or used as the pair of the first fixing members. In addition, plastic hooks, metallic hooks or a hook-and-loop fastener may be applied to or used as the pair of the first fixing members.

As above described, the protective cover 2 of this embodiment is made of a flexible material which can become deformed along the side surface of the body of the camera. A good cover can be obtained by using a fabric, rubber, or a flexible synthetic resin as the material thereof.

Next, another camera embodying the present invention, namely, a second embodiment of the present invention will be described hereinbelow.

Figure 4:
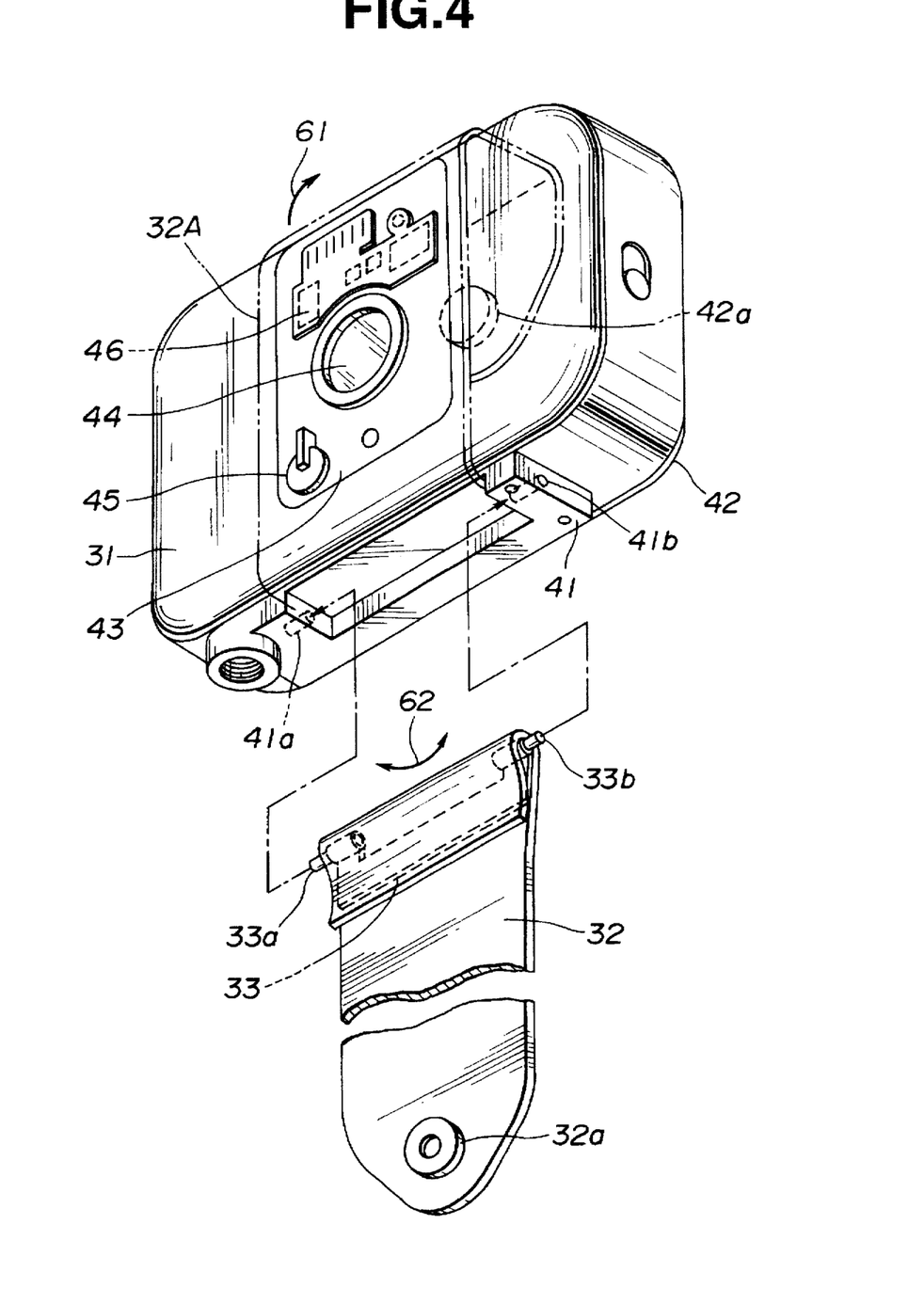
FIG. 4 is a perspective view of another camera embodying the present invention, namely, a second embodiment of the present invention from which a protective cover is removed, taken from the bottom thereof.

As shown in FIG. 4 which is an exploded perspective view of this camera embodying the present invention, namely, the second embodiment of the present invention, a front cover 31 is mounted on the front surface of the body 41 of the camera. Further, a front cover panel 43 is fitted into the central wall surface portion of the cover 31.

A photographing lens 44 serving as an objective optical element of a photographing optical system is provided in the central portion of the cover panel 43. Further, a power switch 45 is provided in the lower portion thereof. Furthermore, a window portion 46 consisting of an AF distance measuring window (or range finder window) and a stroboscopic window used for an AF distance measuring element and a stroboscopic light emitting device, respectively, is provided in the upper portion thereof.

Moreover, an indication LCD 8 (see FIG. 1) is provided on the top surface of the body 41 of the camera. Furthermore, a rear lid 42 is provided on the rear side surface of the body 41 of the camera. Additionally, an eyepiece window is provided in the upper central portion of the rear lid 42. Further, a male magnet hook 42a serving as a first fixing member for keeping the wound state of the protective cover 32 is embedded in a portion thereunder.

Moreover, supporting hole portions 41a and 41b facing to each other are provided or bored in the bottom surface portion of the body 41 of the camera. Furthermore, supporting pins 33a and 33b securely fixed to a plate spring member 33 of a protective cover 32 (to be described later) can be rotatably fitted into the supporting hole portions 41a and 41b, respectively.

The protective cover 32 is made of a bendable belt-like leather, and has a width which corresponds to the width of the cover panel 43.

Figure 5:
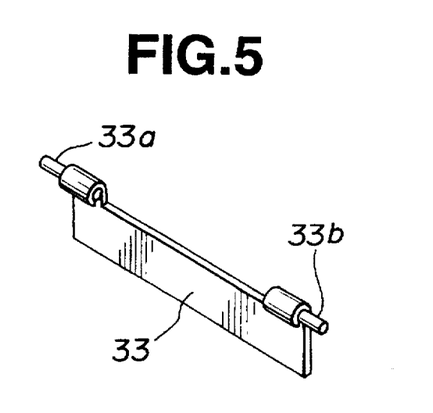
FIG. 5 is a perspective view of a plate spring member to be used as a fixing member attached to the protective cover of the camera of FIG. 4.

Further, the plate spring member 33 acting as an elastic second fixing member is attached to an end portion of the protective cover 32. The plate spring member 33 is made of a metallic thin plate spring which bends in the directions indicated by a double-headed arrow 62 and becomes elastically deformed. Moreover, supporting pins 33a and 33b formed as separate members are securely fixed to both ends of the plate spring member 33 by crimping, respectively, in such a manner as to be placed in parallel with each other, namely, placed across the member 33.

Furthermore, the female magnet hook 32a for keeping the wound position or state 32A of the protective cover 32 (see FIG. 4), namely, keeping the protective cover 32 wound around the body 41 of the camera, which composes the pair of the first fixing members together with the male magnet hook 42a, is rigidly fixed to the other end of the protective cover 2. This female magnet hook 32a is fitted into the male magnet hook 42a, so that the hooks 32a and 42a are attracted and fixed to each other by a magnetic force.

The protective cover 32 can be attached to and detached from the body 42 of the camera. Further, the operations of attachment and detachment of the protective cover 32 are performed by causing the elastic deformation of a plate spring portion of the plate spring member 33.

Figure 6:
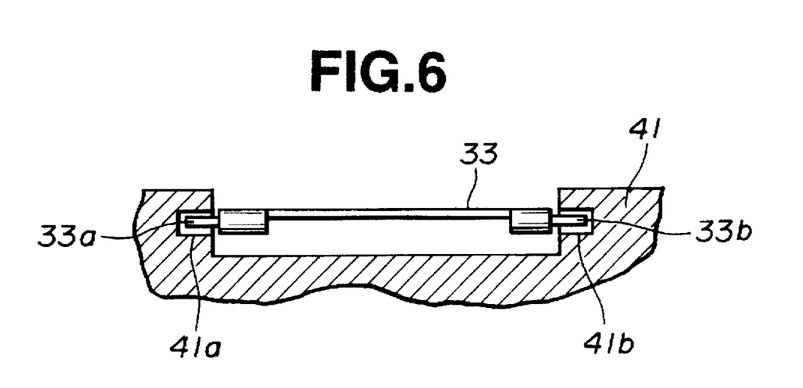
FIG. 6 is a sectional view of the camera of FIG. 4, in which the plate spring member to be attached to the protective cover thereof is fitted into a supporting hole part formed in the lower portion of the body thereof.
Figure 7:
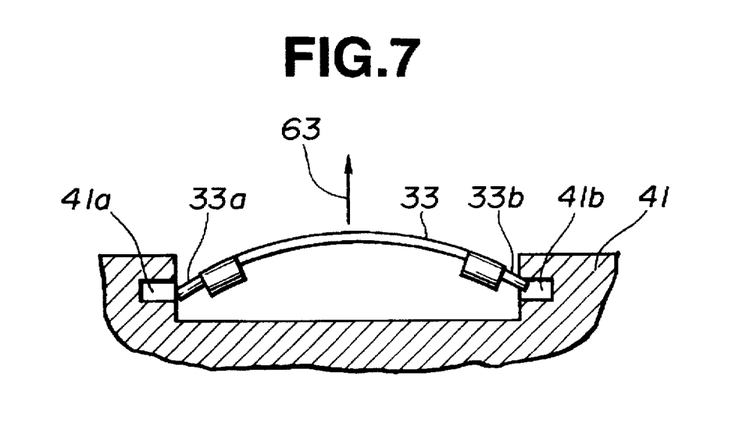
FIG. 7 is a sectional diagram for illustrating how the plate spring member to be attached to the protective cover of the camera of FIG. 4 is removed from the supporting hole part formed in the lower portion of the body thereof.

FIG. 6 is a sectional view of a supporting portion of this camera to which the protective cover 32 is attached. This figure illustrates the state of the camera in which the supporting pins 33a and 33b attached to both ends of the plate spring member 33 are fitted into the supporting hole portions 41a and 41b formed in the body 41 of the camera. Further, FIG. 7 is a sectional view of the supporting portion at the time of removing the protective cover 32 from the body 41 of the camera. When detaching the protective cover 32, the elastic deformation of the plate spring portion of the plate spring member 33 is caused in such a manner that the member 33 is bent. Thus the supporting pins 33a and 33b are retreated, so that the pins 33a and 33b are pulled out of the supporting holes 41a and 41b in the direction of an arrow 63. Consequently, the protective cover 32 can be removed from the body 41 of the camera.

Incidentally, in the case where the protective cover 32 is attached to the body 41 of the camera, similarly, the plate spring 33 is, for example, pressed so as to cause the elastic deformation thereof in a direction opposite to the direction of the arrow 63. Thus, the supporting pins 33a and 33b are rotatably inserted into the supporting hole portions 41a and 41b, respectively. Thereby, the protective cover 32 can be attached to the body 41 of the camera.

In the case of the camera of this embodiment constructed as above described, when attaching the protective cover 32 to the camera, the elastic deformation of the plate spring 33 of the protective cover 32 is caused. Then, the supporting pins 33a and 33b are inserted into the supporting hole portions 41a and 41b of the camera 41. Subsequently, one end portion of the protective cover 32 is attached to the body 41 of the camera.

Further, in order to put this camera into the enclosed state in which this camera can be carried, the protective cover 2 is wound around the body 41 of the camera in the direction of the arrow 61 of FIG. 4. Thus, the camera cover is put into a wound state 32A indicated by two-dot chain lines and curves. Further, the female magnet hook 32a is fitted into and fixed by the magnetic force to the male magnet hook 42b attached to the body 41 of the camera. Thereby, the camera can be easily put into the enclosed state.

When the camera cover is in the wound state 32A in which the protective cover 32 is wound around the body 41 of the camera, a power switch 45, a photographing lens 44, a window portion 46 consisting of windows such as the distance measuring window (or range finder window) and the stroboscopic window, which are provided on a cover panel 43, the LCD mounted on the top portion of the body 41 of the camera and the eyepiece window provided on the rear lid are covered with the protective cover 32. Thus, the camera is put into the enclosed state in which each of the aforementioned members is protected against dust and damage.

Furthermore, in order to put the camera, which has been in the enclosed state, into the ready-to-photograph state, the female magnet hook 32a is detached from the male magnet hook 41a, so that the camera can be put into the ready-to-photograph state by performing a one-touch operation.

Further, when the protective cover 32 should be detached from the body 41 of the camera in the case of performing a continuous photographing, the supporting pins 33a and 33b are inwardly moved by, for example, bending the plate spring 33 in the direction of the arrow 63 as illustrated in FIG. 7. Then, the supporting pins 33a and 33b are pulled out of the supporting hole portions 41a and 41b of the body 41 of the camera. Thus, the protective cover 32 can be easily detached from the body 41 of the camera.

As described above, the camera of this embodiment uses the belt-like protective cover 32 instead of the camera protecting case as used for the conventional camera, the attachment and detachment of which take trouble. Thus, the enclosed state of the camera can be very easily realized by winding the protective cover 32 around the panel 43 or the like provided on the wall of the camera and fitting the magnet hooks into each other. Moreover, the ready-to-photograph state of the camera can be very easily realized by detaching the magnet hooks from each other and unwinding the protective cover 32.

Furthermore, the attachment of the protective cover 32 to the body of the camera, as well as the detachment of the protective cover 32 from the body of the camera, can be very easily achieved by causing the elastic deformation of the plate spring member 33 and retreating the supporting pins 33a and 33b. Thus, the protective cover 32 can be very easily detached as described above in the case where the state of the camera is quickly changed into a state in which a continuous photographing is performed, or in the case where the protective cover becomes a trouble or a hindrance to a photographing if the protective cover remains attached to the body of the camera when the state of the camera is changed into a state in which a long-durance photographing is performed. This is very effective or advantageous.

Additionally, the structure for retreating the supporting pins is a simple structure for causing the elastic deformation of the plate spring member 33. Further, the protective cover 32 is a member that itself has a simple structure using the belt-like leather material. Thus, the camera of this embodiment has an advantage in the low cost thereof.

Incidentally, a reinforcing plate may be put into each of portions which face the photographing lens 44 and the window portion 46 when the protective cover 32 is wound around the body of the camera. Thus, the camera can be protected more perfectly.

Further, artificial leather and synthetic leather other than real leather may be applied to or used as the leather which is the material of the protective cover 32 of the camera of this embodiment. Alternatively, woven fabric cloth may be used as the material of the protective cover 32.

Furthermore, in the case of the embodiment described just hereinabove, the magnet hooks 32a and 42a are applied to or used as the pair of the first fixing members. In addition, plastic hooks, metallic hooks or a hook-and-loop fastener may be applied to or used as the pair of the first fixing members.

Next, several modifications of the second fixing member, which is attached to the protective cover 32 of this embodiment and is used for holding the protective cover on the body of the camera, will be described hereinbelow.

Figure 8:
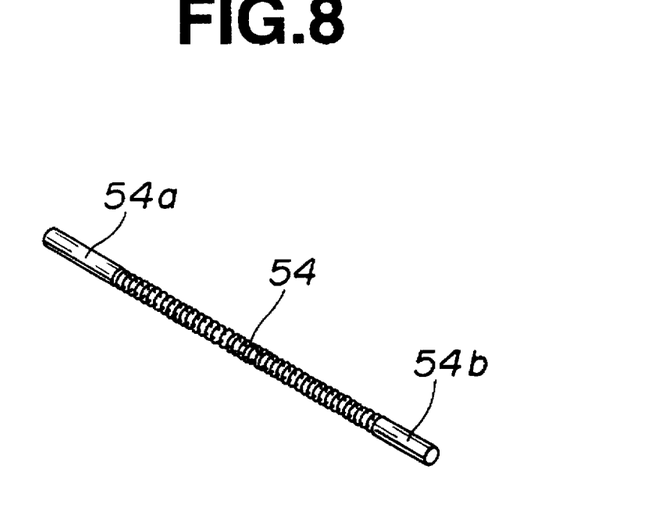
FIG. 8 is a perspective view of a coil spring member to be employed instead of the plate spring member as the fixing member of the protective cover, which is used in a modification of the camera of FIG. 4.

FIG. 8 is a perspective view of a coil spring member 54 which is a modification of the second fixing member to be employed instead of the plate spring member 33. In the case of this modification, supporting pins 54a and 54b are securely fixed to both ends of the plate spring member 33, respectively, in such a manner as to be placed in parallel with each other, namely, placed across the member 54.

In the case where the protective cover, to which the coil spring member of this modification is applied, is attached to or detached from the body 41 of the camera, the coil spring member 54 is bent or compressed in the axial direction and thus is once retreated. Then, the supporting pins 54a and 54b are fitted into or removed from the supporting hole portions 41a and 41b, respectively. In this way, the protective cover is attached to or detached from the body 41 of the camera.

In the case of using the coil spring member 54 of this modification, the coil spring portion offers little fatigue due to deformation. Thus a very usable second fixing member can be provided.

Figure 9:
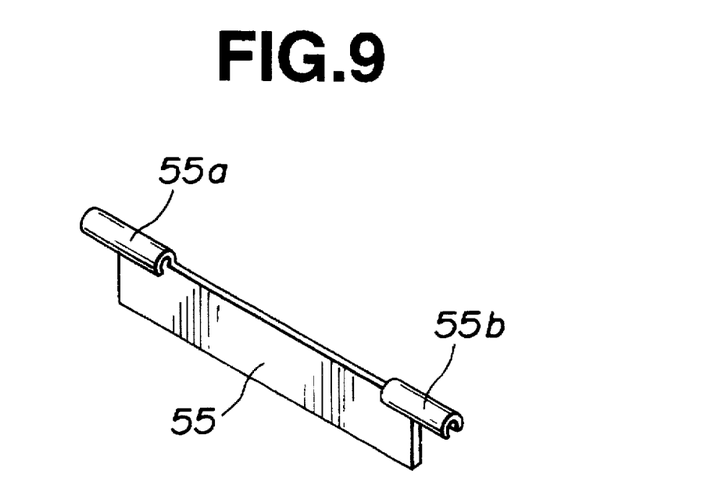
FIG. 9 is a perspective view of another modification of the camera of FIG. 4, in which the supporting pin and the plate spring of the plate spring member of the protective cover are formed in such a manner as to be integral with each other.

In the case of a plate spring member of another modification of the second fixing member as illustrated in a perspective view of FIG. 9, pin-like projection portions 55a and 55b formed in such a way as to be integral with a plate spring member 55 is placed instead of the supporting pins 33a and 33b securely fixed to both ends of the plate spring member 33.

In the case where the protective cover, to which the plate spring member 55 of this modification is applied, is attached to or detached from the body 41 of the camera, the plate spring member 55 is bent and thus is once deformed, similarly as in the case of the protective cover 33 of the aforementioned embodiment. Then, the pin-like projection portions 55a and 55b are fitted into or removed from the supporting hole portions 41a and 41b, respectively.

This modification obviates the necessity of adding the supporting pins, which serve as separate members, to the plate spring member 55. Thus, this modification has an advantage in the low cost thereof.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A camera having a body, comprising:
a protective cover which is formed like a belt and is operative to cover and protect at least an objective optical element of a photographic optical system when held on the body in such a manner as to cover a surface portion of the body;
said protective cover having first and second end portions;
first fixing means for causing the first end portion of the protective cover to be held on the body in such a manner as to be able to be selectively attached thereto or detached therefrom; and
second fixing means for causing the second end portion of the protective cover to be held on the body and for removing the protective cover from the body when the second fixing means undergoes elastic deformation
said second fixing means having a pair of projections provided at said second end portion of the protective cover, said projections extending away from one another along opposing side edges of the protective cover, and resilient means arranged between the projection enabling the distance between the pair of projections to be reduced.

2. The camera according to claim 1, wherein the first fixing means is constituted by a pair of cooperating metallic hooks.

3. The camera according to claim 1, wherein the first fixing means is constituted by a hook-and-loop fastener.

4. The camera according to claim 1, wherein the second fixing means is constituted by a metallic plate spring.

5. The camera according to claim 1, wherein the second fixing means consists of a coil spring and parallel pins fixed to end portions of the coil spring.

6. The camera according to claim 1, wherein the protective cover is made of a flexible material.

7. A camera according to claim 1 wherein said resilient means is an elastic member connected between said projections.

8. A camera according to claim 1 wherein said resilient means engages at least one of said projections.

9. A camera according to claim 7 in which said elastic member comprises a plate spring member which is bendable into a curved contour when said projections are moved toward one another.

10. A camera according to claim 9 wherein said elastic member comprises a coil spring member, said coil spring member being bent in a direction perpendicular to its axis when said projections are moved toward one another.

11. A camera according to claim 9 wherein said elastic member comprises a coil spring member, said coil spring member being compressed in an axial direction when the projections are moved toward one another.

12. A camera according to claim 9 wherein said elastic member comprises a coil spring member, said coil spring member being bent in a direction perpendicular to its axis when the projections are moved toward one another.

13. A camera according to claim 1 wherein said body has a pair of fixed members each provided with a recess, each recess receiving an associated one of said projections which are urged into their associate recesses by said resilient means.

14. A camera according to claim 1 wherein said belt has a loop at said second end portion, said second projection means being arranged in said loop.

15. A camera having a body, comprising:

a protective cover which is formed like a belt and is operative to cover and protect at least an objective optical element of a photographic optical system when held on the body in such a manner as to cover a surface portion of the body;

said protective cover having first and second end portions;

first fixing means for causing the first end portion of the protective cover to be held on the body in such a manner as to be able to be selectively attached thereto or detached therefrom;

second fixing means for causing the second end portion of the protective cover to be held on the body and for unwinding the protective cover from the body when undergoing elastic deformation;

said second fixing means having a pair of projections provided at said second end portion of the protective cover, said projections extending away from one another along opposing side edges of the protective cover, and resilient means arranged between the projections enabling the distance between the pair of projections to be reduced; and said first fixing means being constituted by a pair of cooperating magnet hooks.

16. A camera having a body, comprising:

a protective cover which is formed like a belt and is operative to cover and protect at least an objective optical element of a photographic optical system when held on the body in such a manner as to cover a surface portion of the body;

first fixing means for causing an end portion of the protective cover to be held on the body in such a manner as to be able to be selectively attached thereto or detached therefrom;

second fixing means for causing the other end portion of the protective cover to be held on the body and for unwinding the protective cover from the body when undergoing elastic deformation;

said second fixing means having a pair of projections provided at said other end portion of the protective cover, said projections extending away from one another along opposing side edges of the protective cover, and resilient means arranged between the projections enabling the distance between the pair of projections to be reduced; and said first fixing means being constituted by a pair of cooperating plastic hooks.

17. A camera having a body, comprising:

a protective cover which is formed like a belt and is operative to cover and protect at least an objective optical element of a photographic optical system when held on the body in such a manner as to cover a surface portion of the body;

said protective cover having first and second end portions;

first fixing means for causing the first end portion of the protective cover to be held on the body in such a manner as to be able to be selectively attached thereto or detached therefrom;

second fixing means for causing the second end portion of the protective cover to be held on the body and for unwinding the protective cover from the body when undergoing elastic deformation;

said second fixing means consisting of a metallic plate spring and parallel pins fixed to end portions of the metallic plate spring.

18. A camera having a body, comprising:

a flexible protective cover which is formed like a belt and is operative to cover and protect at least an objective optical element of a photographic optical system when held on the body in such a manner as to cover a surface portion of the body;

said protective cover having first and second end portions;

first fixing means for causing said first end portion of the protective cover to be held on the body, for causing the first end portion of the protective cover to be easily detached from the body when performing a photographing operation and for causing the first end portion of the protective cover to be easily held on the body after the photographing operation is finished; and second fixing means arranged on the camera body for causing said second end portion of the protective cover to be held on the body and for detaching the second end portion of the protective cover from the body when performing a continuous photographing operation said second fixing means having a pair of projections provided at said second end portion of the protective cover, said projections extending away from one another along opposing side edges of the protective cover, and resilient means arranged between the projections enabling the distance between the pair of projections to be reduced.

19. The camera according to claim 18, wherein the first fixing means consists of a pair of attachment/detachment members to be easily attached to or detached from each other.

20. The camera according to claim 18, wherein the second fixing means attaches the second end portion of the protective cover to and detaches the second end portion of the protective cover from the body when said second fixing means undergoes elastic deformation.

21. The camera according to claim 18, wherein the protective cover is operative to cover and protect an objective window of a finder optical system in addition to the objective optical element of the photographing optical system.

22. The camera according to claim 21, wherein a part of the protective cover, which part covers the objective optical element of the photographing optical system, is provided with a reinforcing plate.

23. The camera according to claim 18, wherein the protective cover is made of woven fabric cloth.

24. The camera according to claim 18, wherein the protective cover is made of rubber.

25. The camera according to claim 18, wherein the protective cover is made of a flexible synthetic resin.

26. A camera having a body, comprising:

a protective cover which is formed like a belt and is held on the body in such a manner as to cover a surface portion of the body, the protective cover being operative to cover and protect at least an objective optical element of a photographic optical system when held on the body; and elastic fixing means for causing at least an end portion of the protective cover to be held on the body;

said elastic fixing means having a pair of projections provided at said end portion of the protective cover, said projections extending away from one another along opposing side edges of the protective cover, and resilient means arranged between the projections enabling the distance between the pair of projections to be reached.

27. The camera according to claim 26, wherein the protective cover is made of a leather material.

28. The camera according to claim 27, wherein the leather material is real leather.

29. The camera according to claim 27, wherein the leather material is artificial leather.

30. The camera according to claim 27, wherein the leather material is synthetic leather.

31. The camera according to claim 26, wherein said elastic fixing means consists of a coil spring and pins fixed to end portions of the coil spring.

32. The camera according to claim 26, which further comprises additional fixing means for causing another end portion of the protective cover to be held thereon.

33. The camera according to claim 32, wherein the additional fixing means is constituted by a pair of cooperating plastic hooks.

34. The camera according to claim 32, wherein the additional fixing means is constituted by a pair of cooperating metallic hooks.

35. The camera according to claim 32, wherein the additional fixing means is constituted by a hook-and-loop fastener.

36. A camera having a body, comprising:
a protective cover which is formed like a belt and is held on the body in such a manner as to cover a surface portion of the body, the protective cover being operative to cover and protect at least an objective optical element of a photographic optical system when held on the body;
elastic fixing means for causing at least an end portion of the protective cover to be held on the body; and
said fixing means being constituted by a metallic plate spring.

37. A camera having a body, comprising:
a protective cover which is formed like a belt and is held on the body in such a manner as to cover a surface portion of the body, the protective cover being operative to cover and protect at least an objective optical element of a photographic optical system when held on the body;
elastic fixing means for causing at least an end portion of the protective cover to be held on the body; and
said fixing means consisting of a metallic plate spring and pins fixed to end portions of the metallic plate spring.

38. A camera having a body, comprising:
a protective cover which is formed like a belt and is held on the body in such a manner as to cover a surface portion of the body, the protective cover being operative to cover and protect at least an objective optical element of a photographic optical system when held on the body;
elastic fixing means for causing at least an end portion of the protective cover to be held on the body;
additional fixing means for causing another end portion of the protective cover to be held thereon;
said elastic fixing means having a pair of projections provided at said end portion of the protective cover, said projections extending away from one another along opposing side edges of the protective cover, and resilient means arranged between the projections enabling the distance between the pair of projections to be reduced; and
said additional fixing means being constituted by a pair of cooperating magnet hooks.

* * * * *